United States Patent [19]
Pradet et al.

[11] Patent Number: 4,755,294
[45] Date of Patent: Jul. 5, 1988

[54] STATIONARY PHASE, PREPARATION THEREOF AND CHROMATOGRAPHIC COLUMN CONTAINING SAME

[75] Inventors: Benoît Pradet, Vanves; Jean M. Colin, Le Havre; Robert Rosset, Paris; Gisèle Vion, Harfleur, all of France

[73] Assignee: Societe Anonyme dite Compagnie Francaise de Raffinage, Paris, France

[21] Appl. No.: 795,243

[22] Filed: Nov. 5, 1985

[30] Foreign Application Priority Data

Nov. 6, 1984 [FR] France ................................ 84 16863

[51] Int. Cl.$^4$ ...................... B01D 15/08; B01J 13/00; B05D 7/00; B32B 19/00
[52] U.S. Cl. .............................. 210/198.2; 210/502.1; 252/315.2; 427/220; 428/405; 208/310 R
[58] Field of Search ................ 252/315.2; 106/308 N; 427/220; 428/405; 422/312; 210/198.2

[56] References Cited

U.S. PATENT DOCUMENTS

| | | | |
|---|---|---|---|
| 2,993,809 | 7/1961 | Bueche et al. | 427/220 |
| 3,915,735 | 10/1975 | Moreland | 106/308 N X |
| 4,034,139 | 7/1977 | Mazarguil et al. | 427/220 X |
| 4,121,946 | 10/1978 | Chuiko et al. | 106/288 Q X |
| 4,242,227 | 12/1980 | Nestrick et al. | 210/198.2 X |
| 4,316,807 | 2/1982 | McDaniel et al. | 252/315.2 X |

Primary Examiner—Richard D. Lovering
Attorney, Agent, or Firm—A. Thomas S. Safford

[57] ABSTRACT

The invention relates to a method of preparing a stationary silica phase for the purpose of packing a chromatographic column intended for the liquid-phase separation of components. There are thus effected a first grafting with functional groups of the amine type, a complete hydrolysis of the stationary phase so grafted, and finally a further grafting with functional groups of the alkyl type, optionally substituted. A chromatographic column packed with the stationary silica phase can be used to separate the constituents of a petroleum product.

30 Claims, 2 Drawing Sheets

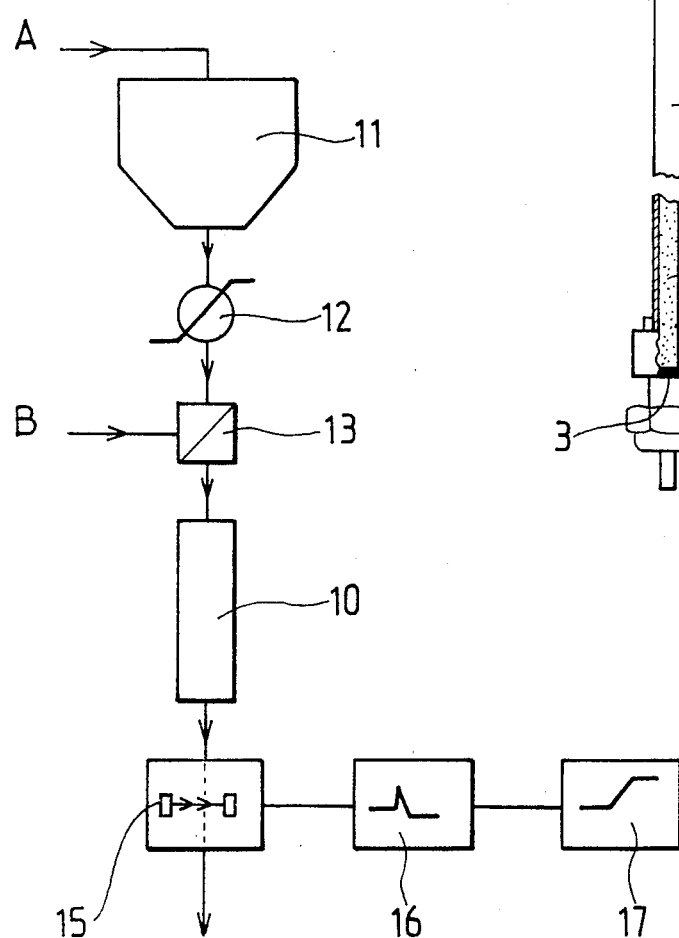

STATIONARY PHASE, PREPARATION THEREOF AND CHROMATOGRAPHIC COLUMN CONTAINING SAME

FIELD OF THE INVENTION

The invention relates to a method of preparing a stationary phase formed of a grafted silica gel for the purpose of packing a chromatographic column intended for the liquid-phase separation of components which comprises the following steps:

Deionization by agitation of the virgin silica in an acidic bath;

a first drying of the virgin silica by heating it for several hours under vacuum at a temperature which generally ranges from 160° to 200° C.;

a first grafting with functional groups of the amine type;

hydrolysis of these first grafts;

a second drying of the silica so grafted; and a second grafting with functional groups of the alkyl type, optionally substituted.

The invention further relates to a chromatographic column packed with such a stationary phase as well as to the use thereof, especially for the separation of the components of a crude petroleum, or of fractions of crude petroleum, by means of a mobile phase such as n-hexane.

The field of the invention is that of chemical analysis, and more particularly that of separation of the components of more or less complex mixtures, specifically by means of liquid-phase chromatography.

BACKGROUND OF THE INVENTION

Liquid-phase column chromatography is one of the oldest chromatographic methods, but until these last few years it had not been widely used, mainly because of the slowness of the separations, the lack of a choice of stationary phases, and the lack of detectors. Now that these obstacles have been overcome, there is a resurgence of this method in a more modern form, under high pressure.

Since liquid-phase chromatography can be subdivided into several classes on the basis of the nature of the phases or of the phenomena involved in the separation of the components, it may be well to specify here that the invention is concerned more particularly with partition chromatography using a grafted stationary phase. In this technique, the separation of the species is based on the difference in their interaction with the molecules with different functional groups which have been grafted onto an appropriate solid, typically a silica gel.

In such a chromatographic column, a mobile liquid phase, the so-called eluting phase, moves through the stationary phase formed by grafting different organic molecules onto a silica gel. These organic molecules will hereinafter be called grafts.

The differential retention by these grafts of the chemical species contained in the mobile phase makes it possible to separate them.

The principal grafts are:
Amines:
—(CH$_2$)$_3$—NH$_2$,
—(CH$_2$)$_3$—N(CH$_3$)$_2$, —(CH$_2$)$_3$—NH—(CH$_2$)$_2$—CH$_3$,

Diamines:
—(CH$_2$)$_3$—NH(CH$_2$)$_2$—NH$_2$
Nitriles:
—(CH$_2$)$_n$—CN
Alkyl chains:
—(CH$_2$)$_n$—CH$_3$
Diols:
—(CH$_2$)$_3$—O—CH$_2$—CH OH—CH$_2$OH
and so forth.

The grafting process usually consists of a condensation reaction between the silanol groups ($\equiv$Si—OH) of the silica gels and a chlorosilane or an alkoxysilane in accordance with the following reaction:

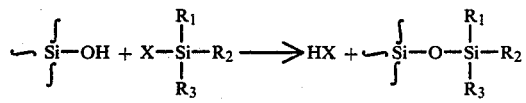

where X=Cl (chlorosilane) or X=OCH$_3$, OC$_2$H$_5$ (alkoxysilane).

Partition chromatography, whose potential uses have considerably increased as a result of the utilization of diverse grafts, is suitable particularly for the separation of homolog species or of species comprising groups of a different nature, polar or nonpolar (for which conventional chromatography and reversed-phase partition chromatography, respectively, are used). It offers the advantage of permitting the analysis of compounds which are too strongly adsorbed on virgin silica gels. (Adsorption chromatography.) The presence and choice of grafts therefore are the essential and determinant characteristics of the method concerned.

Since applicants' objective is primarily the separation of the components (or families of components) of a crude petroleum, or of a fraction thereof, or of the products resulting from the refining thereof, the solubility of the components to be separated in a hydrocarbon (such as n-hexane) inclines it toward a partition chromatography where the stationary phase is a silica grafted with a functional group of the amine type, for example, an aminopropyl, and where the mobile phase is a nonpolar solvent such as n-hexane.

Using such a known chromatographic column, the solutes are roughly eluted in the sequence of their polarity, with the more polar components emerging from the column last. The components of the purely aromatic type thus are retained longer than those of the olefinic or saturated type.

However, in the case of a crude petroleum, and more particularly of a so-called heavy petroleum, a sizable proportion of the components is formed by aromatic rings substituted to a greater or lesser extent with long alkyl chains, and the behavior of these complex molecules toward the nonpolar eluant (n-hexane) or the stationary phase is intermediate between that of the components of the olefinic or saturated type and the components of the purely aromatic type. Their proper separation therefore is rendered extremely difficult.

OBJECTS OF THE INVENTION

An object of the invention is to produce a stationary phase grafted silica gel material for the liquid phase chromatographic separation of the components of petroleum. Another object of the invention is to prepared a chromatographic column utilizing the stationary phase grafted silica gel material prepared in accordance with the invention. A further object of the invention is to orient the selectivity of such a chromatographic column toward the different families of hydrocarbons present in a petroleum product, and especially to separate the saturated compounds and the olefins from the aromatics.

In accordance with the present invention, the method of preparing a stationary silica phase mentioned in the introductory part is distinguished by the fact that the hydrolysis of the first grafts is effected through a progressive treatment, by agitating the silica so grafted in a hydrofuran bath, then gradually adding water to the hydrofuran, and finally replacing the hydrofuran/water mixture completely with water.

Thus, the grafts present on the silica are of the amine type, whose function is to retain the aromatics (such retention being the more pronounced the more aromatic rings are present in the component), and of the alkyl type, whose function is to retain the aromatics having a long aliphatic chain.

Thus, a stationary phase comprising grafts of these two types will make it possible both to sufficiently separate the aromatics and retain the aromatics substituted with long aliphatic chains for a greater length of time than can be done with the prior-art columns.

In accordance with one embodiment of the invention, the functional groups first grafted onto the silica are obtained from n-propylaminotrichlorosilane, and the second graft is an alkylsilane, and more particularly a trimethylchlorosilane:

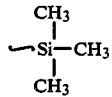

This graft assures retention by interaction with the hydrocarbon chain substituted on an aromatic ring.

BRIEF DESCRIPTION OF THE DRAWINGS

In the drawings,

FIG. 1 shows a partly cut-away front elevation of a chromatographic column of a known type;

FIG. 2 shows the flowchart of liquid-phase chromatography;

Figure 3A:
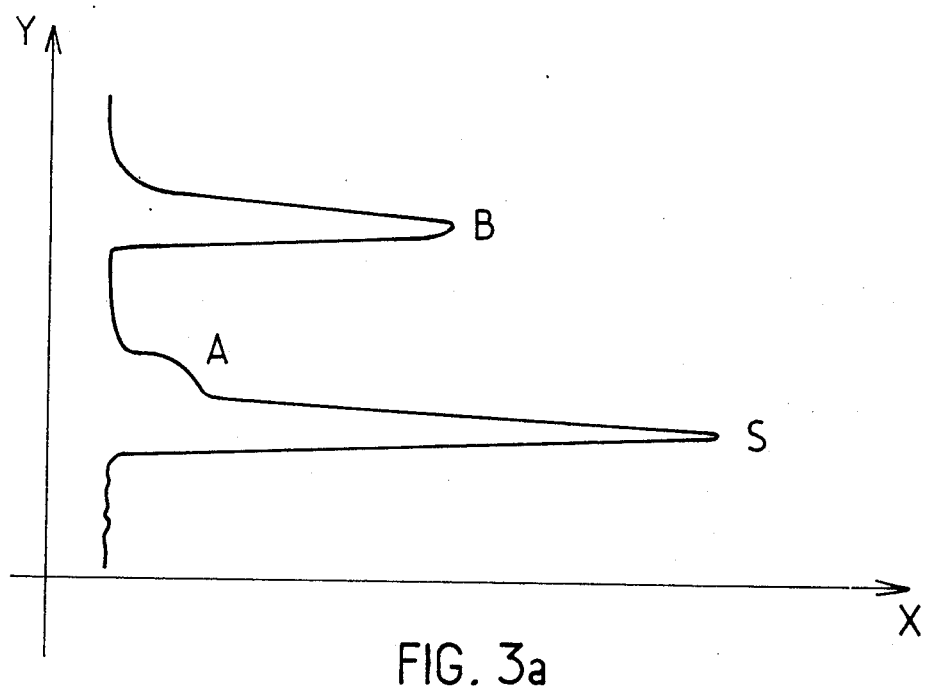
FIG. 3a is a chromatogram obtained with a prior-art column.

Partition chromatography permits the species to be separated on the basis of the difference in the interaction between two nonmiscible phases, namely, a first, stationary phase, in this case, a synthetic silica of very small particle size (typically with a nominal diameter of between 3 and 10 microns) on which polar molecules have been grafted, and a second, mobile phase that is a nonpolar solvent. This type of chromatography is known as conventional partition chromatography, as distinguished from reversed-phase partition chromatography, in which the mobile phase is a polar solvent and the stationary phase is nonpolar.

The prior-art methods of preparing stationary phases generally consist in reacting the silica in an absolutely anhydrous medium with the organic molecule to be grafted. The initial product is a porous silica gel of small particle size that is characterized by the presence of silanol groups ($\equiv$Si—OH) typically of the order of 5-OH per $nm^2$. These silanol groups are very reactive and it is possible to graft onto them diverse organic molecules called grafts.

A variety of stationary phases are being marketed by companies such as Waters, Du Pont, Varian, Merck, etc., under various trade names (such as Micropack, Lichrosorb, etc.), and their selectivity for the different chemical species varies a great deal.

Thus there are known from the prior art grafts of the amine, nitrile, alkyl, diol and other types, the principal ones of which have been referred to in the introductory part.

For reasons which have to do with the contemplated use (separation of the different families of a petroleum product), applicants are interested particularly in stationary phases of the alkylamine type. This graft is typically obtained by a reaction based on an alkylaminotrialkoxysilane. The principal organic molecules which have been put on the market are:

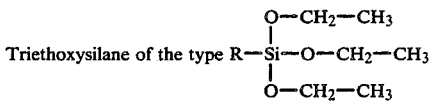

and

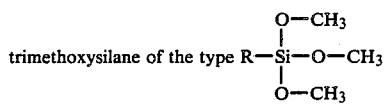

wherein R represents the alkylamine functional group in the form
R=N-n-propylethylenediamine (—$(CH_2)_3$—NH—$CH_2$—$CH_2$—$NH_2$) or
R n-propylamine (—$(CH_2)_3$—$NH_2$),
these being the two functional groups usually commercialized. By reaction between the silica and the molecule to be grafted, there is then formed a linkage of the type

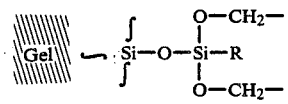

DETAILED DESCRIPTION OF PREFERRED EMBODIMENTS

To this end, the virgin silica is agitated in an acidic medium, such as a concentrated and hot mixture of sulfuric and nitric acids, for the removal of ions, then washed with water to free it of mineral ions present at its surface and so that there may thus be as many reactive silanol groups present as possible. The silica is then dried for about 15 hours under vacuum at a temperature ranging from 160° to 200° C., and typically at 180° C. The silanization reaction as such is then carried out, the silica being suspended in an anhydrous solvent such as xylene in the presence of the organosilane selected. Depending on the operating conditions (temperature, reaction time, reactant ratio, etc.) employed, varying grafting levels will be obtained. The excess of silane is then eliminated by washing with the same anhydrous solvent.

Such a stationary phase according to the prior art is disposed in a chromatographic column 10, as shown in FIG. 1. The column consists of an internally smooth stainless-steel tube 1 whose length and inside diameter may vary. The stationary phase 2 is held within the column by means of a sintered stainless-steel disk 3 of appropriate porosity for retaining even the smallest particles without giving rise to an excessive loss of pressure in the installation.

As shown in the flowchart of FIG. 2, a solvent A is introduced into a reservoir 11 and moved at relatively high pressure (which may be as high as several hundred bar) by a pump 12 into the chromatographic column 10 as such. The pump 12 may be of various types, for example, of the constant-pressure type, such as the pneumatic pumps, or of the constant-flow type, such as the syringe pumps or the reciprocating pumps. An injector 13 permits the introduction into the solvent of the sample B to be analyzed, generally by means of a sampling valve. The combination of solvent A and sample B forms the mobile phase which travels through the chromatographic column 10 in which the stationary phase is held. After its passage through the column, the mobile phase is analyzed by means of a detector 15 (such as an ultraviolet absorption detector or a differential refractometer), then the signal emitted by the detector 15 is recorded by a recorder 16, which may be followed by an integrator 17 for performing quantitative analyses, or, more generally, a processing system for the data provided by the detector.

More detailed information on the state of the art will be found in the work entitled "Manuel pratique de chromatographie en phase liquide", by R. Rosset, M. Caude and A. Jardy, 2nd ed., Masson, Paris, 1982.

The efficacy of such prior-art chromatographic columns is measured quantitatively as the resolution obtained between the different chemical families whose separation they make possible.

As pointed out in the introductory part of this specification, the aromatics present in petroleum products may be of a character intermediate between purely aromatic and aliphatic. In such cases, the prior-art chromatographic columns may be unable to sufficiently separate these components, which are eluted at the same time as the simple olefins and the saturated compounds.

In accordance with the present invention, the hydrolysis of the first grafts is effected through a progressive treatment by agitating the silica so grafted in a bath of hydrofuran. Water is then gradually added to the hydrofuran, and finally the hydrofuran/water mixture is replaced completely with water.

A second grafting is then effected, which involves mainly the -OH groups liberated on the aminopropyl graft by hydrolysis, in accordance with the following reaction:

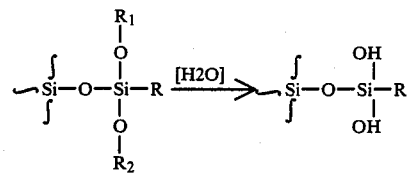

wherein $R_1$ and $R_2$ are $-CH_3$, $-OCl$ or $-O-C_2H_5$ groups. This interpretation is given here solely by way of an explanation and shall in no wise be construed as limiting the rights of applicants if it should develop that it is not entirely accurate. To permit this, a hydrolysis step is necessary between the first grafting of the amine functional group and the subsequent alkyl grafting.

This second grafting thus permits a bifunctional stationary phase to be obtained which assures the retention of both the purely aromatic compounds and the aromatics with a long aliphatic chain.

Thus, by varying the grafting level of these two types of grafts, a stationary phase is obtained which sufficiently separates the aromatics from the saturated compounds and sufficiently retains the aromatics with long aliphatic chains.

Moreover, it should be noted here that the invention described above is not merely a juxtaposition of previously known means but a veritable combination producing a synergistic effect. As a matter of fact, a mixture of two stationary phases, one grafted with aminopropyl and the other with alkyl, will not permit the saturated compounds and the olefins to be separated from the long-chain aromatics. Thus a novel effect is present that is due to the grafting onto one and the same silica of two grafts of different types, one on top of the other.

Figure 3B:
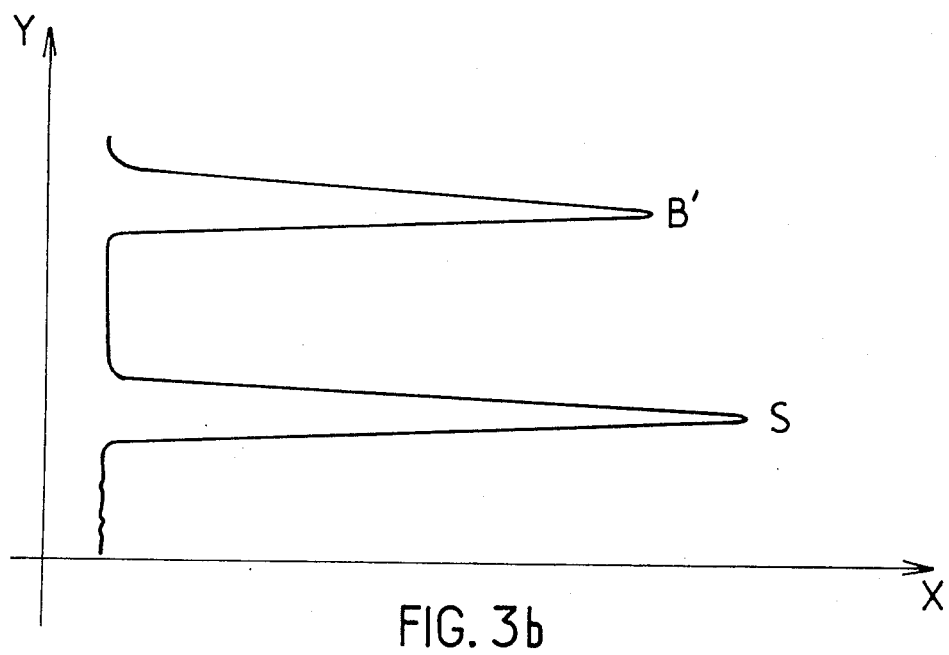
FIG. 3b is a chromatogram obtained with the column of the invention.

The characteristic chromatograms shown in FIGS. 3a and 3b were obtained by using n-hexane as eluting solvent and as detector an ultraviolet spectrophotometer fixed at 210 mm. The flow rate is 1 ml/min. The abscissa axis X represents the signal from the detector. (Arbitrary unit.) The ordinate axis Y represents the retention time. (Unit: 1 cm≃1 minute.) The separation of the chemical species of the saturated type (peak S) and of the monoaromatic type (shoulder A) is readily apparent in FIG. 3a. In FIG. 3b, the species of the monoaromatic type are seen to be grouped with the polyaromatics. (Peak B'.)

In accordance with a preferred embodiment of the invention, the functional groups first grafted onto the virgin silica are obtained by reaction with n-propylaminotriethoxysilane, and after hydrolysis as described above and a second drying under the same conditions as the first drying, the functional group subsequently grafted, obtained by reaction, is a trimethylchlorosilane:

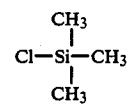

In fact, the major disadvantage of the prior-art chromatographic columns is that they do not sufficiently retain aromatics with long aliphatic chains.

An objective to be attained thus is to increase the affinity of these components for the stationary phase, and the means employed consists in grafting onto that phase grafts of the nonpolar type, such as alkyls, the simplest of these being the methyls. This group is usually supplied in the form of a trimethylchlorosilane (TMCS) diluted in xylene in a manner somewhat similar to the grafting method described above. The grafted silica/xylene/TMCS mixture is agitated for about 15 hours at a temperature ranging from 120° to 150° C., and preferably of 140° C., in a balloon flask. After the reaction, the silica is washed with dry xylene with filtering through frit.

The reaction time depends on the desired level of grafting and also on the grafting level secured before. It is usually desired to obtain a maximum level of grafting. In seeking to facilitate the second grafting, applicants found that the presence of traces of residual water after the second drying facilitated the anchoring of the second grafts. However, in order that reproducible conditions of preparation of the phases might be obtained, it was inadvisable to leave traces of water in the stationary phase; rather, it was preferable to dry the silica so grafted and hydrolyzed very thoroughly and then reintroduce a few traces of water representing from 0.1 to 1 weight percent, based on the silica.

This method represents a substantial technical advance over the known methods, and particularly over that described in the article by R. E. Majors entitled "Studies of siloxane phases bonded to silica gel for use in highperformance liquid chromatography" on pp. 769–778 of the Journal of Chromatographic Science, vol. 12, December 1974, since it is not known in that method to leave traces of residual water after drying.

Thus the chromatographic columns in accordance with the present invention, obtained by packing with a doubly grafted stationary phase, possess increased selectivity, especially when used for the separation of the chemical constituents of a crude petroleum or of a crude-petroleum fraction.

Moreover, their sensitivity to the level of humidity is very low because all accessible silanol groups are suppressed or very strongly reduced by the double grafting so effected. Finally, the polar solutes are not irreversibly retained, for the same reasons. Thus the chromatographic columns in accordance with the invention are easier to use and to monitor, and they are readily reproducible by one skilled in the art who follows the teachings of the present specification.

We claim:

1. A method of preparing a silica gel grafted with amine and alkyl groups, useful as a stationary phase packing material of a chromatographic column intended for the liquid phase separation of components, comprising the steps of:
   (a) deionizing virgin silica in an acidic bath with agitation;
   (b) first drying the deionized virgin silica by heating it for several hours under vacuum at a temperature from 160° to 200° C.;
   (c) first grafting the dried silica with amine type functional groups; (d) hydrolyzing the first grafts by means of a hydrolyzing bath effective to provide reactive terminal silanol groups at least partially on said first grafts;
   (e) second drying the silica so hydrolized; and
   (f) second grafting the dried silica with substituted or unsubstituted alkyl type functional groups.

2. A method of preparing a stationary silica phase according to claim 1, wherein the first grafting is obtained by reaction between the virgin silica and n-propylaminotrichlorosilane in the presence of xylene at a temperature ranging from 120° to 150° C.

3. A method of preparing a stationary silica phase according to claim 2, wherein the second grafting is effected by reaction between the first-grafted and hydrolyzed silica and trimethylchlorosilane in the presence of xylene at a temperature ranging from 120° to 150° C.

4. A method of preparing a stationary silica phase according to claim 3, wherein the second drying is effected under the same conditions as the first so as to eliminate all traces of water.

5. A method of preparing a stationary silica phase according to claim 4, wherein traces of water representing from 0.1 to 1 weight percent, based on the silica, are reintroduced after the second drying in order to facilitate the second grafting.

6. A method of preparing a stationary silica phase according to claim 1, wherein the second grafting is effected by reaction between the first-grafted and hydrolyzed silica and trimethylchlorosilane in the presence of xylene at a temperature ranging from 120° to 150° C.

7. A method of preparing a stationary silica phase according to claim 1, wherein the second drying is effected under the same conditions as the first so as to eliminate all traces of water.

8. A method of preparing a stationary silica phase according to claim 7, wherein traces of water representing from 0.1 to 1 weight percent, based on the silica, are reintroduced after the second drying in order to facilitate the second grafting.

9. A method of preparing a stationary silica phase according to claim 1, wherein traces of water representing from 0.1 to 1 weight percent, based on the silica, are reintroduced after the second drying in order to facilitate the second grafting.

10. A method of preparing a stationary silica phase according to claim 1, wherein the first grafts are hydrolyzed through a progressive treatment in a hydrofuran bath with agitation, gradually adding water to the mixture and finally replacing the hydrofuran/water mixture completely with water.

11. A stationary phase obtained by carrying out the method according to claim 1.

12. A stationary phase obtained by carrying out the method according to claim 3.

13. A stationary phase obtained by carrying out the method according to claim 5.

14. A stationary phase obtained by carrying out the method according to claim 7.

15. A chromatographic column comprising a stationary phase prepared by the method according to claim 1.

16. A chromatographic column comprising a stationary phase prepared by the method according to claim 3.

17. A chromatographic column comprising a stationary phase prepared by the method according to claim 5.

18. A chromatographic column comprising a stationary phase prepared by the method according to claim 7.

19. A material, useful as stationary phase packing in a liquid phase chromatographic separation column, comprising a silica gel grafted with amine and substituted or unsubstituted alkyl functional groups.

20. A material according to claim 19 wherein the amine functional groups are obtained from an alkylaminochlorosilane or an alkylaminoalkoxysilane and the substituted or unsubstituted alkyl functional groups are obtained from a substituted or unsubstituted alkylchlorosilane or a substituted or unsubstituted alkylalkoxysilane.

21. A material according to claim 20 wherein the alkylaminochlorosilane is n-propylaminotrichorosiline.

22. A material according to claim 20 wherein the alkylchlorosilane is trimethylchlorosilane.

23. A material according to claim 20 wherein in an alkylaminoalkoxysilane or an alkylalkoxysilane, the alkoxy portion consists of from one to three $-OCH_3$ or $-OC_2H_5$ groups.

24. A material according to claim 19 wherein the amine functional group is alkylamine or alkyldiamine.

25. A material according to claim 24 wherein the alkylamine is
$-(CH_2)_3-NH_2$,
$-(CH_2)_3-N(CH_3)_2$,
$-(CH_2)_3-NH-(CH_2)_2-CH_3$, or

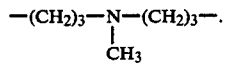

26. A material according to claim 24 wherein the alkyldiamine is $-(CH_2)_3-NH(CH_2)_2-NH_2$.

27. A material according to claim 19 wherein the substituted or unsubstituted alkyl functional group is straight or branched chain alkyl or alkyldiol.

28. A material according to claim 27 wherein the straight chain alkyl is $-(CH_2)_3-CH_3$.

29. A material according to claim 27 wherein the alkldiol is $-(CH_2)_3-O-CH_2-CHOH-CH_2OH$.

30. A material, useful as stationary phase packing in a liquid phase chromatographic separation column, comprising a silica gel containing a plurality of silanol groups, the silica gel being first directly grafted with amine functional groups by condensation reaction between at least a portion of the silanol groups of the silica gel and a chlorosilane or alkoxysilane, both substituted with at least one amine functional group selected from the group consisting of amines and diamines, the grafted silica gel then being hydrolyzed to form hydroxyl groups on the first grafts and the grafted silica gel then being further indirectly grafted with alkyl functional groups by condensation reaction between at least a portion of the hydroxyl groups fromed on the first grafts and a chlorosilane or alkoxysilane, both substituted with at least one alkyl or alkyldiol group.

* * * * *